US008167435B2

(12) United States Patent
Mitsuhashi et al.

(10) Patent No.: US 8,167,435 B2
(45) Date of Patent: May 1, 2012

(54) PROJECTION SYSTEM AND PROJECTOR

(75) Inventors: Setsu Mitsuhashi, Tokyo (JP);
Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 490 days.

(21) Appl. No.: 12/448,161

(22) PCT Filed: Feb. 22, 2008

(86) PCT No.: PCT/JP2008/053069
§ 371 (c)(1),
(2), (4) Date: Jun. 11, 2009

(87) PCT Pub. No.: WO2008/102873
PCT Pub. Date: Aug. 28, 2008

(65) Prior Publication Data
US 2010/0014056 A1    Jan. 21, 2010

(30) Foreign Application Priority Data

Feb. 23, 2007  (JP) .................... 2007-043697
Feb. 23, 2007  (JP) .................... 2007-043698

(51) Int. Cl.
*G03B 21/14* (2006.01)
(52) U.S. Cl. ............. 353/69; 353/79; 353/122; 359/452
(58) Field of Classification Search .............. 353/69, 353/28, 37, 54, 79, 122; 359/446, 452, 453
See application file for complete search history.

(56) References Cited

U.S. PATENT DOCUMENTS

| 6,084,594 A | 7/2000 | Goto | |
|---|---|---|---|
| 7,524,068 B2* | 4/2009 | Hayashi et al. | 353/51 |
| 7,780,297 B2* | 8/2010 | Seki | 353/79 |
| 2005/0151941 A1* | 7/2005 | Solomon | 353/122 |
| 2006/0244930 A1* | 11/2006 | Hayashi et al. | 353/97 |

FOREIGN PATENT DOCUMENTS

| JP | 06-159998 A | 6/1994 |
|---|---|---|
| JP | A-09-117446 | 5/1997 |
| JP | A-10-024030 | 1/1998 |
| JP | A-11-018025 | 1/1999 |
| JP | 2001-092579 A | 4/2001 |
| JP | 2003-210837 A | 7/2003 |
| JP | 2003-210844 A | 7/2003 |
| JP | 2005-055822 A | 3/2005 |
| JP | A-2006-138939 | 6/2006 |
| WO | WO 2005/099253 A1 | 10/2005 |

OTHER PUBLICATIONS

Notification of Reasons for Refusal issued Jan. 31, 2012, in Japanese Application No. 2007-043698.
Notification of Reasons for Refusal issued Jan. 31, 2012, in Japanese Application No. 2007-043697.

* cited by examiner

*Primary Examiner* — Seung C Sohn
(74) *Attorney, Agent, or Firm* — Miles & Stockbridge P.C.

(57) ABSTRACT

A projection system includes: a projection device mounted at a member that moves through space and projects an optical image; a detection device that detects relative position assumed in the space by a projection target surface onto which the optical image is projected and the projection device; and a control device that controls projection by the projection device in correspondence to the relative position detected by the detection device.

22 Claims, 11 Drawing Sheets

FIG.11

á (a) ⟷ あ

í (i) ⟷ い uh (u) ⟷ う

Figure 1:
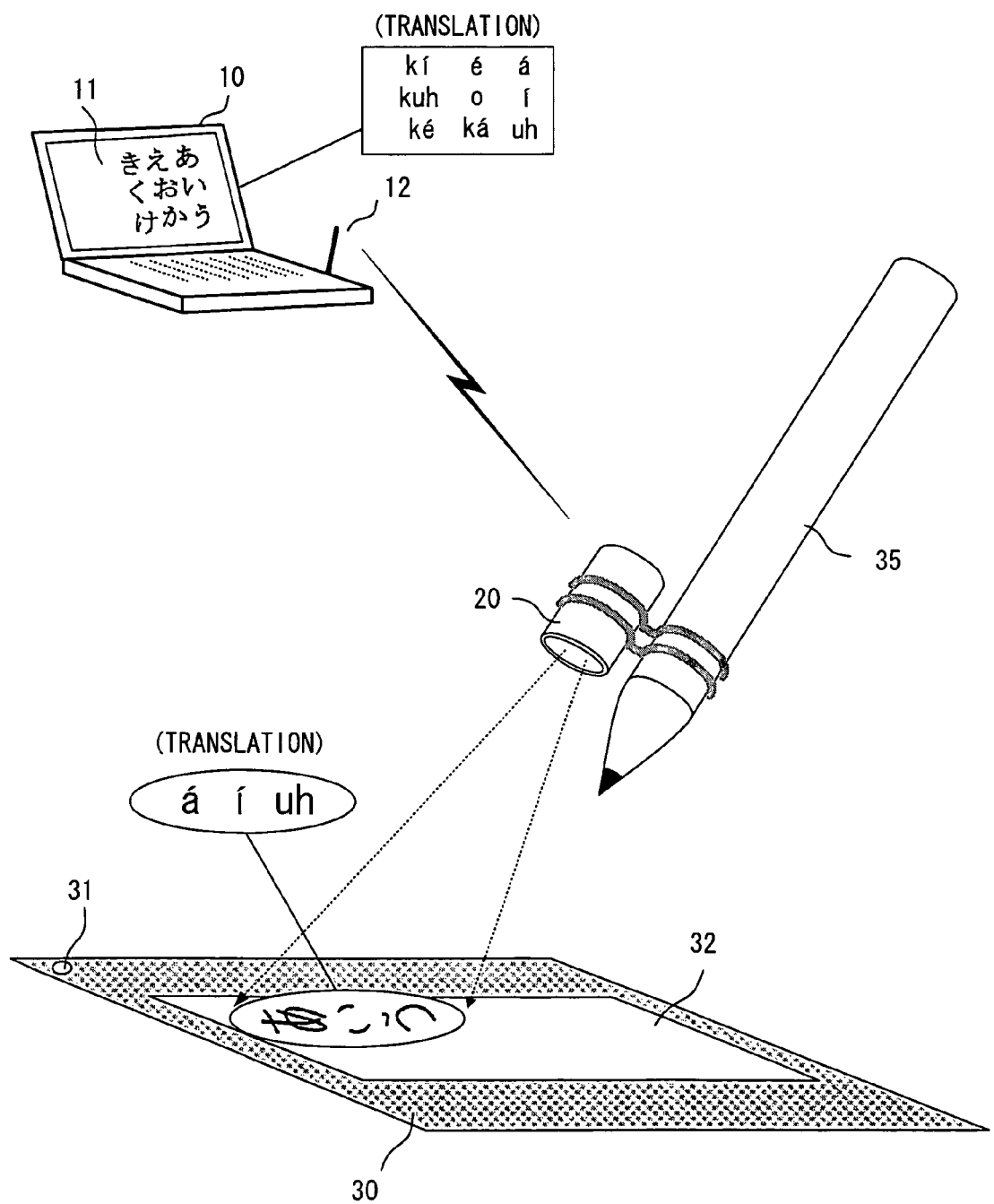

é (e) ⟷ え o (o) ⟷ お ká (ka) ⟷ か kí (ki) ⟷ き kuh (ku) ⟷ く ké (ke) ⟷ け

PROJECTION SYSTEM AND PROJECTOR

TECHNICAL FIELD

The present invention relates to a projection system and a projector.

BACKGROUND ART

There is a technology known in the related art whereby the extent of movement in the position of a projection image projected onto a projection target surface, attributable to a wobble at the projection device, is minimized by detecting the change in the attitude of the projection device (see patent reference 1). There are applications in the known art in which an optical image is projected onto a wall surface or the like (also see patent reference 1). In such applications, control is executed whenever the projection direction along which the projection device projects the image shifts so as to reduce the extent of shaking of the projection image on the projection target surface.

Patent reference 1: Japanese Laid Open Patent Publication No. 2006-138939

DISCLOSURE OF THE INVENTION

Problems to be Solved by the Invention

There is an issue yet to be effectively addressed in the related art in that the stability of the projection image cannot be assured if the attitude of the projection target surface changes. In addition, the same information is projected even when the projection direction changes.

Means for Solving the Problems

According to the 1st aspect of the present invention, a projection system comprises: a projection device mounted at a member that moves through space and projects an optical image; a detection device that detects relative position assumed in the space by a projection target surface onto which the optical image is projected and the projection device; and a control device that controls projection by the projection device in correspondence to the relative position detected by the detection device.

According to the 2nd aspect of the present invention, in the projection system according to the 1st aspect, it is preferred that the detection device includes a magnetic source that is disposed at the projection target surface or a surface upon which a projection target member having the projection target surface is placed, and generates a specific magnetic field, and magnetic sensors that are disposed at the projection device and individually detect magnetism manifesting along three axes extending perpendicular to one another.

According to the 3rd aspect of the present invention, in the projection system according to the 1st or 2nd aspect, it is preferred that the control device corrects trapezoidal distortion of the optical image projected by the projection device in correspondence to the relative position detected by the detection device.

According to the 4th aspect of the present invention, in the projection system according to anyone of the 1st through 3rd aspects, it is preferred that the control device executes scroll control or vibration correction control for information included in the optical image projected by the projection device in correspondence to a change occurring in the relative position detected by the detection device.

According to the 5th aspect of the present invention, in the projection system according to the 4th aspect, it is preferred that the control device executes the scroll control for the information included in the optical image projected by the projection device when an extent of change in the relative position detected by the detection device, occurring along a single direction parallel to the projection target surface, is equal to or greater than a predetermined value.

According to the 6th aspect of the present invention, in the projection system according to the 4th aspect, it is preferred that the control device executes the vibration correction control for the information included in the optical image projected by the projection device when an extent of change in the relative position detected by the detection device, occurring along a single direction parallel to the projection target surface, is less than a predetermined value.

According to the 7th aspect of the present invention, in the projection system according to any one of the 4th through 6th aspects, it is preferred that the control device controls a volume of information to be included in the optical image projected by the projection device in correspondence to change occurring in the relative position detected by the detection device.

According to the 8th aspect of the present invention, in the projection system according to the 7th aspect, it is preferred that when the change in the relative position detected by the detection device manifests along a direction perpendicular to the projection target surface, the control device executes control so that a size of a projection range over which the projection device projects the optical image and a size of the information included in the optical image prior to the change in the relative position are maintained after the change in the relative position.

According to the 9th aspect of the present invention, in the projection system according to the 7th aspect, it is preferred that when the change in the relative position detected by the detection device manifests along a direction perpendicular to the projection target surface, the control device executes control so as to maintain a size of information included in the optical system, even if a size of a projection range over which the projection device projects the optical image after the change in the relative position is different from the size of the projection range prior to the change in the relative position.

According to the 10th aspect of the present invention, in the projection system according to the 1st aspect, it is preferred that the control device controls the projection device to project information corresponding to the relative position detected by the detection device.

According to the 11th aspect of the present invention, in the projection system according to the 10th aspect, it is preferred that: the projection system further comprises a storage device where information to be projected by the projection device is stored; and the control device reads out information assuming an area corresponding to the relative position detected by the detection device from the storage device and controls the projection device to project the information thus read out.

According to the 12th aspect of the present invention, in the projection system according to the 10th or 11th aspect, it is preferred that the detection device includes a magnetic source that is disposed at the projection target surface or a surface upon which a projection target member having the projection target surface is placed and generates a specific magnetic field and magnetic sensors that are disposed at the projection device and individually detect magnetism manifesting along three axes extending perpendicular to one another.

According to the 13th aspect of the present invention, in the projection system according to anyone of the 10th through 12th aspects, it is preferred that the control device executes control so as to project the optical image that includes first information indicating contents to be applied on the projection target surface.

According to the 14th aspect of the present invention, in the projection system according to the 13th aspect, it is preferred that the control device further executes control so as to project the optical image that includes second information related to the first information.

According to the 15th aspect of the present invention, in the projection system according to the 13th or 14th aspect, it is preferred that the control device executes control so as to project the optical image over a specific range of the projection target surface when the relative position detected by the detection device satisfies a predetermined condition.

According to the 16th aspect of the present invention, in the projection system according to the 15th aspect, it is preferred that the control device executes control so as to project the optical image that includes information in the first information corresponding to the specific range.

According to the 17th aspect of the present invention, in the projection system according to the 16th aspect, it is preferred that the control device executes control so as to project the optical image that further includes information in the second information corresponding to the specific range.

According to the 18th aspect of the present invention, in the projection system according to anyone of the 15th through 17th aspects, it is preferred that the member that moves through the space is a coloring member that colors the projection target surface or a processing member that processes the projection target surface.

According to the 19th aspect of the present invention, in the projection system according to the 18th aspect, it is preferred that: the first information includes at least one of a character, a graphic, a mark and a coloring position at which the projection target surface is to be colored by the coloring member, or at least one of a character, a graphic and a mark indicating a processing position at which the projection target surface is to be processed by the processing member; and the second information includes at least either a procedure or a description related to coloring or processing.

According to the 20th aspect of the present invention, in the projection system according to the 18th aspect, it is preferred that if the relative position indicates that a position assumed by the coloring member and the coloring position do not correspond to each other or that a position assumed by the processing member and the processing position do not correspond to each other, the control device executes control so as to project the optical image that includes information pointing toward the coloring position or the processing position.

According to the 21st aspect of the present invention, in the projection system according to the 20th aspect, it is preferred that if the relative position indicates that the position assumed by the coloring member and the coloring position correspond to each other or that the position assumed by the processing member and the processing position correspond to each other, the control device executes control so as to project the optical image that includes the first information corresponding to the specific range instead of the information pointing toward the coloring position or the processing position.

According to the 22nd aspect of the present invention, a projector comprises: a projection unit that projects an optical image; a three-dimensional position sensor that detects a position in space; a communication device that transmits detection information provided by the three-dimensional position sensor to an external device and receives projection information transmitted from the external device based upon the detection information; and a control device that controls the projection unit so as to project an optical image that includes the projection information received via the communication device.

Advantageous Effect Of The Invention

According to the present invention, the projection image can be held steady even if the attitude of the projection target surface changes. In addition, specific types of information can be projected at specific positions on the projection target surface corresponding to different projection directions.

BRIEF DESCRIPTION OF THE DRAWINGS (FIG. 1) A projection system achieved in a first embodiment of the present invention (FIG. 2) A block diagram presenting a structural example that may be adopted in the projector (FIG. 3) An example of an optical system that may be included in the projection unit (FIG. 4) An example of a projection image (FIG. 5) An example of a projection image under scroll control (FIG. 6) An example of a projection image projected via the projector set apart from the base pad over a significant distance (FIG. 7) An example of a projection image of a related message (FIG. 8) An example of a projection image that may be projected in a second embodiment (FIG. 9) An example of a projection image of a message (FIG. 10) An example of a projection image (FIG. 11) The correspondence between the characters referred to in the description of the embodiments and the characters shown in the figures.

BEST MODE FOR CARRYING OUT THE INVENTION

The following is a description of the best mode for carrying out the present invention given in reference to the drawings.

First Embodiment

FIG. 1 presents an example of a projection system that may include a projector 20 achieved in the first embodiment of the present invention. The projection system is configured as a combination of the projector 20, a computer 10 and a base pad 30. FIG. 1 illustrates an application in which the user uses the system for penmanship assistance by copying characters with a writing tool 35 on paper 32 placed on the base pad 30. The projector 20, attached to the writing tool 35, projects information transmitted from the computer 10 through wireless communication onto the paper 32.

A magnetic source 31 that generates a specific magnetic field is installed at the base pad 30, whereas the projector 20 includes a built-in magnetic sensor. The projection system detects the relative position and attitude of the projector 20 in relation to the base pad 30 (paper 32) in three-dimensional space based upon a magnetism detection signal provided by the magnetic sensor and executes projection control for the projector 20 based upon the detection results.

While the base pad 30 is ideally placed on a stable surface such as a table, it may be instead placed on the lap of the user, on the fold-out tray on a train, aircraft or the like.

The computer 10 executes a preinstalled penmanship assistance projection control program. The computer 10 executes a specific arithmetic operation by using magnetism detection data transmitted from the projector 20 and transmits a control signal through wireless communication to the projector 20 from an antenna 12 of a wireless communication module so as to project information (characters in this example) to be used as a guide onto the paper 32. The program includes data expressing an image of a master example character set and related information data to be described later.

Figure 2:
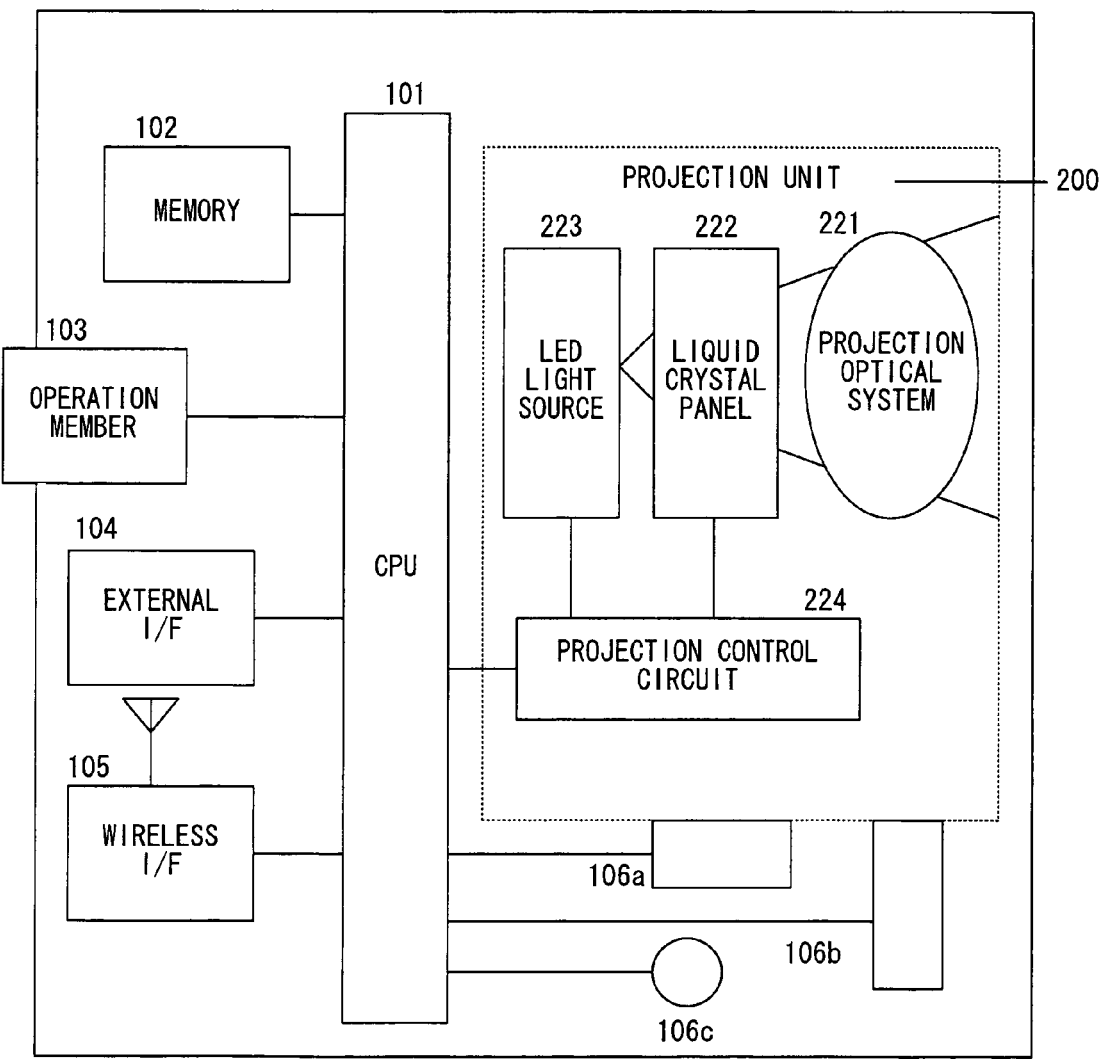

FIG. 2 is a block diagram of a structural example that may be adopted in the projector 20. The projector 20 in FIG. 2 comprises a projection unit 200, a CPU 101, a memory 102, an operation member 103, an external interface (I/F) circuit 104, a wireless interface circuit 105 and magnetic sensors 106a~106c, and is driven on power supplied from a battery (not shown).

The CPU 101 individually controls the projection operation and the communications operation of the projector 20 by outputting control signals intended for various units in the projector 20, generated through specific arithmetic operations and the like executed using signals input from the individual units in the projector 20. It is to be noted that the control program is stored in a non-volatile memory (not shown) in the CPU 101.

The memory 102 is used by the CPU 101 as a work area. The operation member 103, which includes a main switch and the like, outputs, for instance, an ON/OFF signal to the CPU 101. The external interface circuit 104 engages in command and data exchange with an external device such as a cradle and also receives a charging current. The wireless interface circuit 105 exchanges control signals constituted with commands, data and the like with the computer 10 by engaging in wireless communication with the computer 10.

The magnetic sensors 106a~106c, constituting a three-dimensional position detection sensor system, are disposed along three axes extending perpendicular to one another. The magnetic sensors 106a~106c detect magnetism along the three axial directions in which the individual magnetic sensors are disposed and output detection signals to the CPU 101. The CPU 101 outputs an instruction for the wireless interface circuit 105 so as to transmit the magnetism detection signals corresponding to the various directions to the computer 10.

The CPU 101 transmits a control signal to the projection unit 200 in correspondence to a command and data received from the computer 10 via the wireless interface circuit 105. The projection unit 200 includes a projection optical system 221, a liquid crystal panel 222, an LED light source 223 and a projection control circuit 224. The LED light source 223 illuminates the liquid crystal panel 222 with a luminance level corresponding to the current supplied thereto. The liquid crystal panel 222 generates an optical image in correspondence to a drive signal provided from the projection control circuit 224. The projection optical system 221 projects an enlargement of the optical image output from the liquid crystal panel 222. The projection control circuit 224 outputs drive signals to the LED light source 223 and the liquid crystal panel 222 in response to an instruction issued by the CPU 101.

While the liquid crystal panel 222 in the embodiment is constituted with a reflective liquid crystal panel as described later, the present invention may instead be adopted in conjunction with a transmission-type liquid crystal panel. It is to be noted that the present invention may be further adopted in conjunction with a DMD instead of the liquid crystal panel 222.

Figure 3:
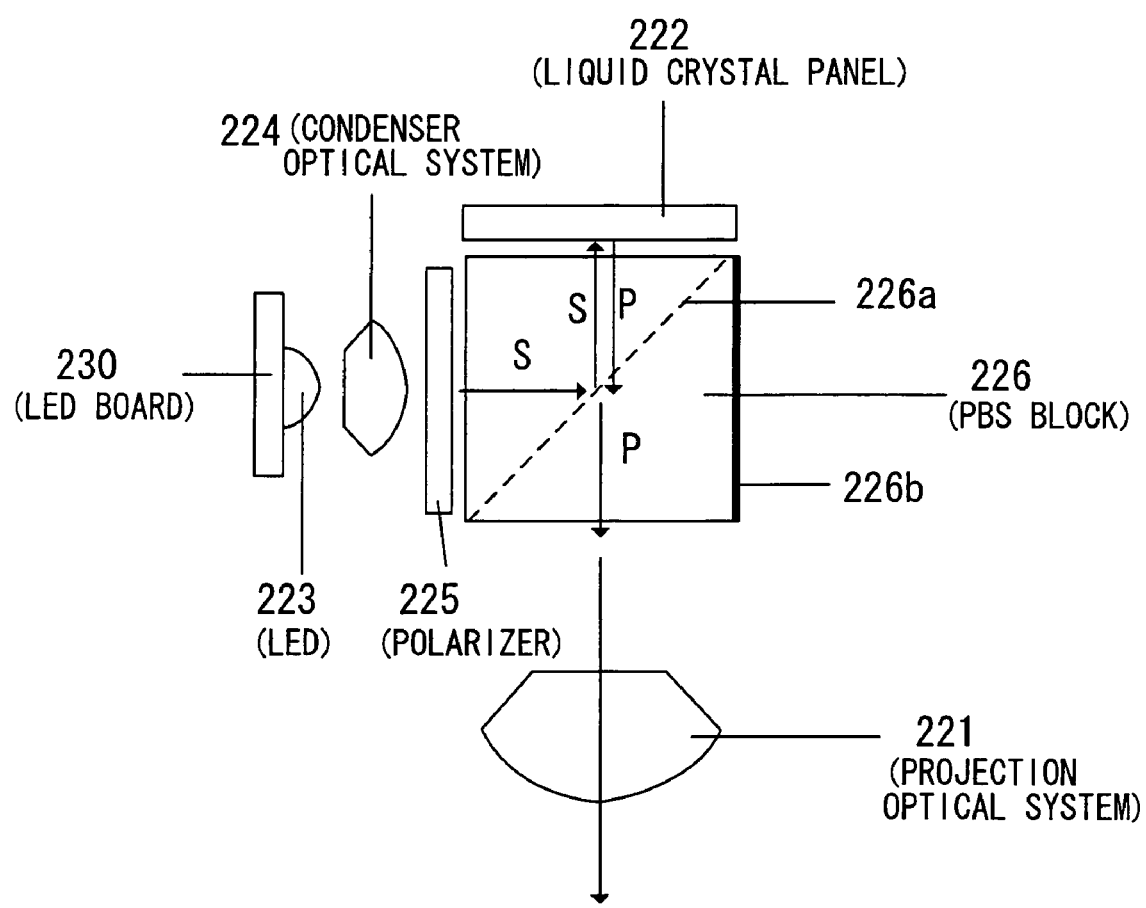

In reference to FIG. 3 illustrating the optical system in the projection unit 200, the projection unit 200 is described in further detail. The optical system in the projection unit 200 is disposed by orienting its longer side along the vertical (up/down) direction. The optical system includes an LED 223 (LED board 230), a condenser optical system 224, a polarizer 225, a PBS (polarization beam splitter) block 226, the liquid crystal panel 222 and the projection optical system 221. The LED 223 used as a light emitting element is mounted on a pattern formed on the LED board 230.

The PBS block 226 is a polarization beam splitter formed by enclosing a polarization splitter portion 226a set at 45° angle to the optical axis of incident light between two triangular prisms. A surface 226b of the PBS block 226 will have undergone an anti reflection treatment such as blackening.

The polarizer 225 is disposed near the left side surface of the PBS block 226 (the surface closer to the condenser optical system 224), whereas the liquid crystal panel 222 constituted with reflective liquid crystal elements (LCOS) is disposed near the upper side surface of the PBS block 226.

A drive current is supplied to the LED 223 disposed on the LED board 230 via a harness and a wiring pattern (not shown) in the projection unit structured as described above. The LED 223 emits white light with the luminance level corresponding to the drive current toward the condenser optical system 224. The LED light, adjusted at the condenser optical system 224 to become substantially parallel light, then enters the polarizer 225. The light having entered the polarizer 225 is converted to linearly polarized light (or linearly polarized light is extracted at the polarizer) and the polarized light resulting from the conversion (or extraction) is directed toward the PBS block 226.

The polarized light flux (e.g., S-polarized light) having entered the PBS block 226 is reflected (bent) upward at the polarization beam splitter portion 226 of the PBS block 226 and the reflected light illuminates the liquid crystal panel 222. The liquid crystal panel 222, constituted with a plurality of pixels at which red, green and blue filters are disposed, is driven so as to generate a color image. The light, having entered the liquid crystal panel 222, advances upward through a liquid crystal layer at the liquid crystal panel 222, is reflected at a reflective surface of the liquid crystal panel 222, advances downward through the liquid crystal layer and is emitted from the liquid crystal panel 222 to reenter the PBS block 226. Since the liquid crystal layer, with a voltage applied thereto, functions as a phase plate, the light reentering the PBS block 226 is mixed light that includes modulated light, i.e., P-polarized light, and unmodulated light, i.e., S-polarized light.

At the PBS block 226, only the modulated light constituted with the P-polarized light component in the reentered light flux, is transmitted and guided to the projection optical system 221 disposed below. Via the projection optical system 221, the projection light emitted from the PBS block 226 is radiated toward a position below the projector 20.

(Trapezoidal Correction)

The light from the projector 20 may be projected onto the surface of the paper 32 along a direction other than the vertical direction. Accordingly, the CPU 101 also executes trapezoidal distortion correction processing so as to correct trapezoidal distortion of the projection image that would otherwise manifest whenever the projector 20 projects light along a diagonal direction. The CPU 101 issues a projection instruction to the projection control circuit 224 after first executing the trapezoidal distortion correction processing on projection information. The attitude of the projector 20, which must be ascertained for the trapezoidal distortion correction, is calculated by the CPU 101 based upon the magnetism detection signals corresponding to the three axes via the magnetic sensors 106a~106c.

(Determining Projection Information)

The computer 10 determines the information to be projected via the projector 20 by calculating, based upon the magnetism detection signals detected along the three axes, having been received from the projector 20, the relative attitude of the projector 20 in relation to the base pad 30 (paper 32) and the distance from the base pad 30 (paper 32) to the projector 20. In the embodiment, a group of characters to be written within the range projected via the projector 20, included in the set of characters to be written over the entire paper 32, is designated as the projection information. The projection information (image data corresponding to the specific group of characters) thus determined by the computer 10 is then transmitted to the projector 20 through wireless communication. It is to be noted that the projection information may be transmitted to the projector 20 after executing trapezoidal distortion correction processing at the computer 10 based upon the relative attitude of the projector 20.

Figure 4:
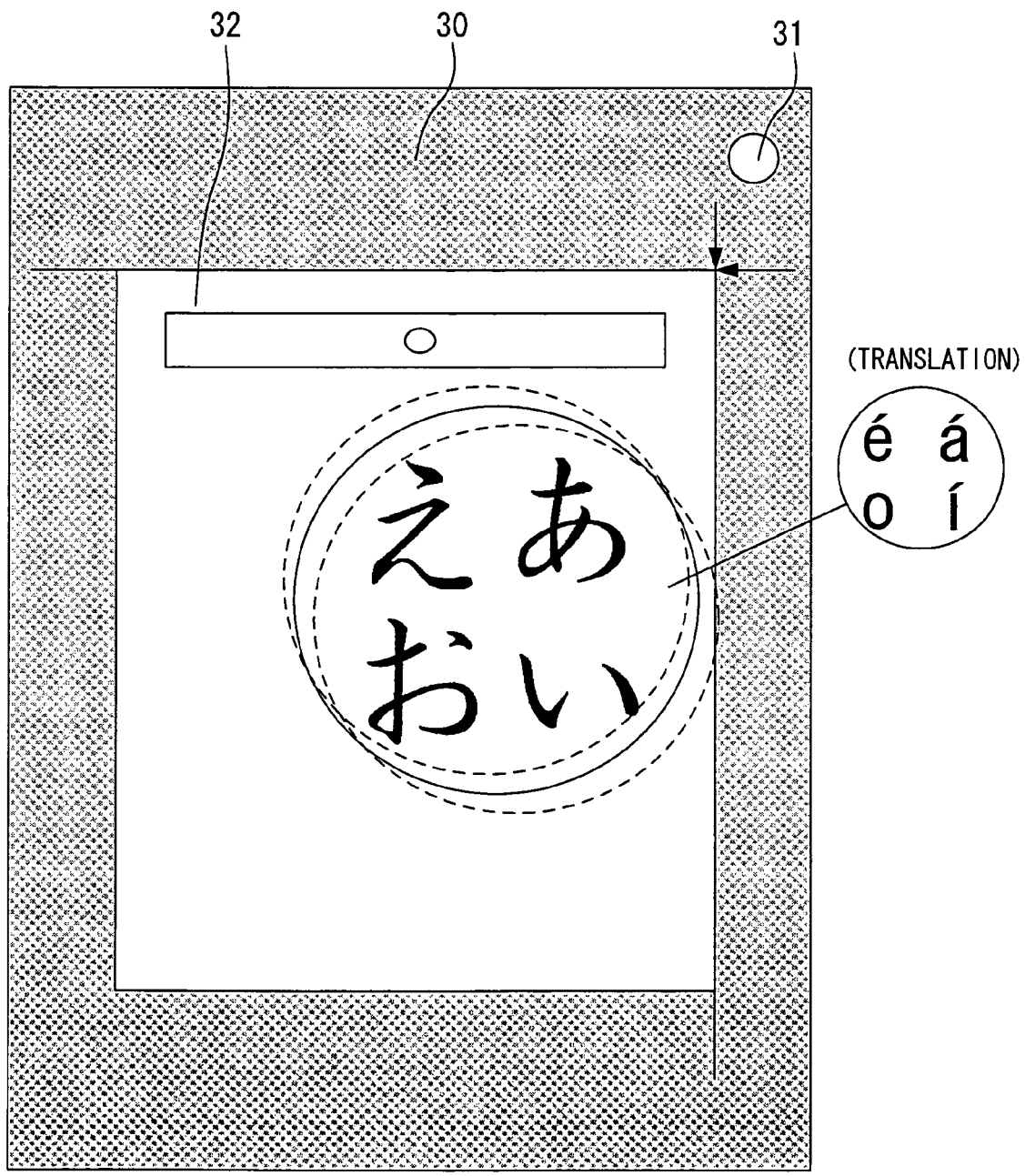

The CPU 101 at the projector 20 having received the projection information sent by the computer 10 then executes the trapezoidal distortion correction described earlier on the received projection information and outputs a drive signal to the projection control circuit 224 so as to generate an optical image of the group of characters having undergone the trapezoidal distortion correction. FIG. 4 presents an example of a projection image. FIG. 4 shows the paper 32 placed on the base pad 30 with the upper right corner of the paper aligned with a predetermined origin point of the base pad. The image is projected via the projector 20 over the circular range indicated by the solid line. The group of characters "á, í, uh, é, oh" corresponding to the circular projection rage in the set of characters "á, í, uh, é, oh, ká, kí, kuh, ké" is projected. Circular ranges indicated by dotted lines are to be explained later.

It is to be noted that the embodiment is described by assuming that the set of characters include Japanese alphabet characters "á, í, uh, é, oh, ká, kí, kuh, ké". In addition, FIGS. 1 and 4~7 show Japanese characters. However, it will be obvious that the present invention may be adopted in conjunction with a set of characters in any other language. For instance, the present invention may be adopted in conjunction with a set of alphabet characters "a b c d e f g h i" instead of the set of Japanese alphabet characters "á, í, uh, é, oh, ká, kí, kuh, ké". The present invention may be further adopted in conjunction with a set of Chinese characters, a set of Hangul characters or the like. FIG. 11 shows the correspondence between the characters referred to in the description of the embodiments and the characters in the illustrations presented in FIGS. 1 and 4~7.

(Scroll Control)

Figure 5:
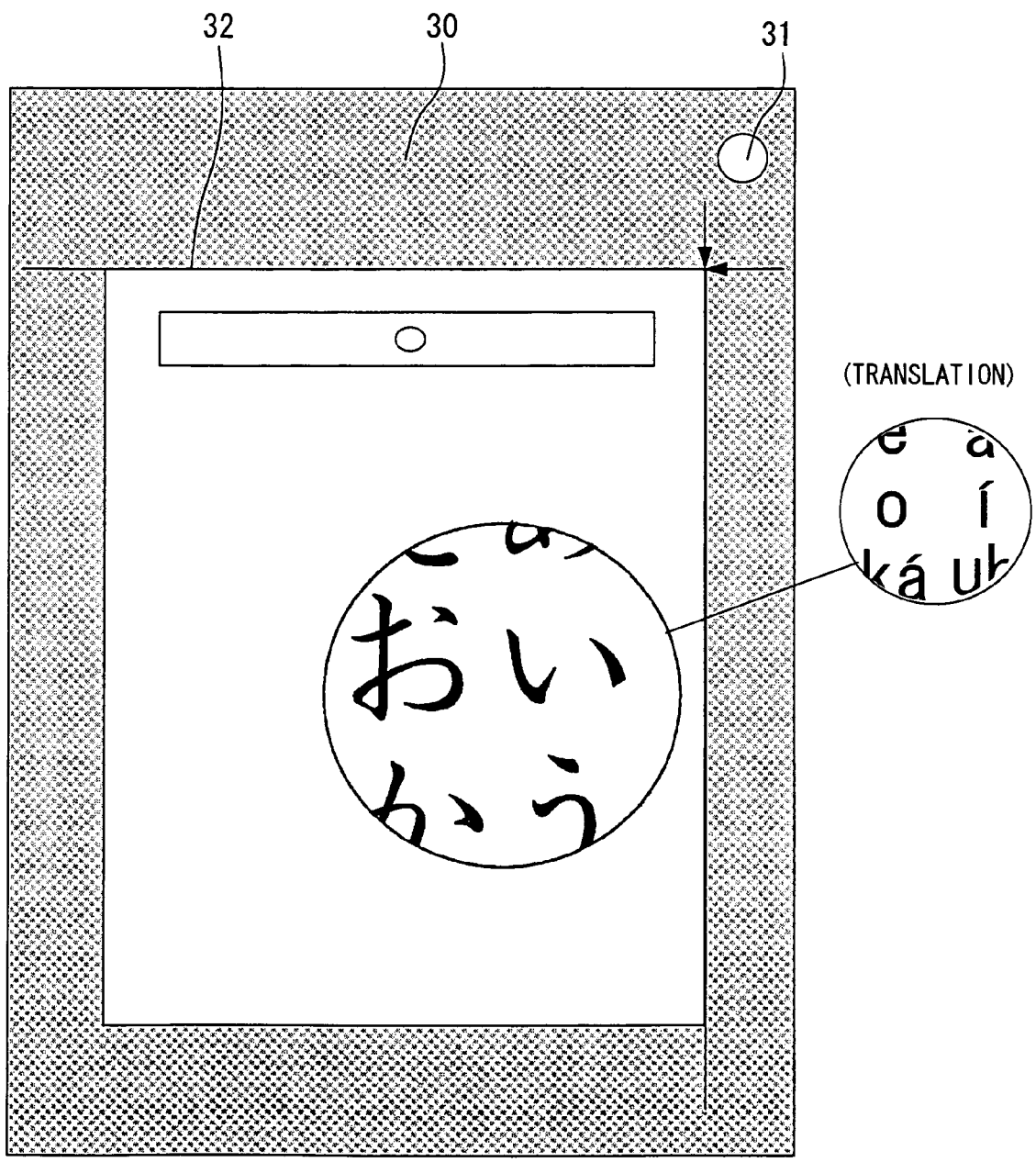

When the projection range of the projector 20 changes, the computer 10 designates the group of characters (e.g. "i, oh") to be written in the new projection range as the projection information. Any displacement of the projection range can be detected based upon the magnetism detection signals corresponding to the three axial directions, which are received from the projector 20. The CPU 101 at the projector 20 having received the projection information sent by the computer 10 then executes the trapezoidal distortion correction described earlier on the received projection information and outputs a drive signal to the projection control circuit 224 so as to generate an optical image of the group of characters having undergone the trapezoidal distortion correction. FIG. 5 presents an example of a projection image that may be projected under scroll control. The group of characters "í, oh" corresponding to the circular projection rage in the set of characters "á, í, uh, é, oh, ká, kí, kuh, ké" is projected, as shown in FIG. 5.

As described above, the computer 10 executes scroll control for the projection information as the projection range over which the image is projected via the projector 20 changes. It is to be noted that the present invention may be adopted in an alternative structure in which image data of the entire set of characters to be written on the paper 32 are provided in advance to the projector 20 and set in the memory 102 in the projector 20 and when the position (i.e., the projection range) of the projector 20 shifts, the computer 10 transmits to the projector 20 coordinate data corresponding to the new projection range of the projector 20. In such a case, the CPU 101 in the projector 20 will read from the memory 102 the data indicated by the coordinates received from the computer 10, execute trapezoidal distortion correction on the data thus read out and then output a drive signal to the projection control circuit 224.

(Zoom Control)

When the distance from the projector 20 to the base pad 30 (paper 32) changes, the computer 10 controls the projection magnification factor so as to keep the projection size of the projection information (the group of characters) projected on the paper 32 unchanged. In more specific terms, it controls the projection magnification factor so as to ensure that the projection information (the group of characters) contained in the projection range is not enlarged and reduce the projection range when the distance between the projector 20 and the base pad 30 (paper 32) increases. In contrast, when the distance between the projector 20 and the base pad 30 (paper 32) decreases, the computer ensures that the projection size of the projection information (the group of characters) contained in the projection range is not reduced and widens the projection range. As a result, regardless of the distance between the projector 20 and the base pad 30 (paper 32), the projection information (group of characters) is projected in a uniform projection size, as shown in FIGS. 4 and 5 (i.e., taking up uniform areas on the paper 32). The projection magnification factor is controlled through the electronic zoom method by altering the size of the image formed on the liquid crystal panel 222. It is to be noted that the projection magnification factor may instead be controlled through optical zoom adjustment by installing a zoom lens in the projection optical system 121 and shifting it along the optical axis.

(ON/OFF Control)

In addition, the computer 10 provides an ON/OFF instruction for turning ON/OFF the projection via the projector 20 in correspondence to the distance from the base pad 30 (paper 32) to the projector 20 and the orientation of the projector 20, in the form of a control signal transmitted to the projector 20. For instance, the computer 10 may execute control so as to turnoff the projection if the distance between the projector 20 and the paper 32 is equal to or greater than 20 cm or if the orientation (projection direction) of the projector 20 does not intersect the base pad 30 (paper 32) and to turn on the projection once the orientation (projection direction) of the projector 20 intersect the base pad 30 (paper 32) and the distance between the projector 20 and the paper 32 becomes less than 20 cm.

(Focus Adjustment for the Projection Image)

The computer 10 transmits information indicating the distance from the base pad 30 (paper 32) to the projector 20 having been calculated to the projector 20. The CPU 101 in the projector 20 executes autofocus adjustment for the projection image projected via the projection unit 200 by shifting the focus lens (not shown) constituting part of the projection optical system 221 along the optical axis based upon the distance information having been received.

The projector assumes a structure that also enables manual focus adjustment. Manual focus adjustment is executed based upon a focus adjustment signal generated in correspondence to an operation signal output from the operation member 103 and provided by the CPU 101 to the projection control circuit 224. The projection control circuit 224 shifts the focus lens (not shown) along the optical axis in correspondence to the focus adjustment signal so as to achieve manual focus adjustment for the projection image projected via the projection unit 200.

The following advantages are achieved through the first embodiment described above.

1) The projection via the projector 20 is controlled in correspondence to the positions assumed by the projector 20 and the base pad 30 (paper 32) relative to each other within the space. As a result, even if the attitude of the projector 20 or the base pad 30 changes or if the attitudes of both the projector 20 and the base pad 30 change, control is executed to project the contents in an optimal manner. For instance, by executing distortion correction or the scroll control for a set of characters, a group of characters assuring optimal viewability for the user can be projected.
2) Since the relative positions are detected via the magnetic fields generated with the magnetic source 31 installed in the base pad 30, the relative positions can be detected accurately through a non-contact method.
3) Since the trapezoidal distortion of the projection image is corrected based upon the detected relative positions, the extent of distortion to the image of the master example character set can be minimized even when the image is not projected perpendicular to the surface of the paper 32 from the projector 20.
4) Since the scroll control is executed for the information to be included in the projection image in correspondence to the change in the detected relative positions, the master example character set can be projected in an optimal manner even as the projector 20 moves parallel to the surface of the paper 32.
5) The master example character set is scrolled when, for instance, the extent of positional displacement between the projector 20 and the paper 32 along a given direction parallel to the surface of the paper 32 is equal to or greater than a predetermined value and, as a result, a group of characters adjacent to the group of characters having been projected before the displacement can be projected at the position assumed after the displacement.
6) Since the volume of information to be included in the projection image is controlled based upon a detected change in the relative positions, the master example character set can be projected in an optimal manner even as the projector 20 moves perpendicular to the surface of the paper 32.
7) Since it is ensured that the projection range and the size of the projected characters remain unchanged even after the positional relationship between the projector 20 and the paper 32 along the perpendicular direction changes, the group of characters having been projected before the change in the positional relationship can be projected in the same size after the change in the positional relationship.
8) Since autofocus adjustment for the projection image, projected via the projection unit 200, is executed in correspondence to the positions of the projector 20 and the base pad 30 (paper 32) relative to each other (in correspondence to the distance between the projector and the base pad), there is no need for installing a sensor dedicated to focus detection.
9) Since the information corresponding to the relative positions assumed by the projector 20 and the base pad 30 (paper 32) in the space is projected, information desired by the user can be projected at a position desired by the user.
10) When adopted in, for instance, a penmanship assistance application, characters in the master example character set can be projected at specific positions on the paper 32, allowing the user to copy the characters at the positions at which the master example characters are projected.
11) The projection by the projector 20 is automatically turned on when the orientation (projection direction) of the projector 20 intersects the base pad 30 (paper 32) and the projector 20 assumes a position less than 20 cm from the paper 32, so as to project an optical image over the circular projection rage. However, the projection by the projector 20 is turned off if the projection target surface is not present along the projection direction or if the distance between the projector 20 and the projection target surface is greater than the predetermined value and thus, the projector is not engaged in unnecessary projection.
12) An optical image of the characters corresponding to the circular projection range in the master example character set is projected and thus, as the projector 20 projects light onto a specific position on the paper 32, the master example of target characters can be projected within the projected range.

(Variation 1)

The projection ON/OFF control based upon the distance between the projector 20 and the base pad 30 (paper 32) may be executed through a criterion that is the reverse of that adopted in the first embodiment. Namely, the projection may be turned on when the distance between the projector 20 and the paper 32 is equal to or greater than 20 cm and the projection may be turned off once the distance becomes less than 20 cm. It is to be noted that the cutoff distance for the ON/OFF changeover may be adjusted as necessary.

(Variation 2)

Projection OFF/ON/OFF control may be executed based upon the distance between the projector 20 and the base pad 30 (paper 32). For instance, the projection may be turned off once the distance between the projector 20 and the paper 32 becomes equal to or greater than 20 cm, the projection may be turned on when the distance is less than 20 cm and then the projection may be turned off when the projector assumes a position very close to the paper, e.g., less than 5 cm.

(Variation of the Zoom Control)

The volume of projection information (the number of characters) may be increased when the distance from the projector 20 to the base pad 30 (paper 32) increases. In such a case, the computer 10 controls the projection magnification factor so as to ensure that the projection size of the projection information (the size of the individual characters) remains unchanged even if the projection rage (areal size) changes as the distance between the projector 20 and the base pad 30 (paper 32) changes. More specifically, it executes control so as to increase the volume of projection information (the number of characters) to be included in the wider projection rage when the distance between the projector 20 and the base pad 30 (paper 32) increases and to decrease the volume of rejection information (the number of characters) to be included in the projection range when the distance between the projector 20 and the base pad 30 (paper 32) is smaller.

Figure 6:
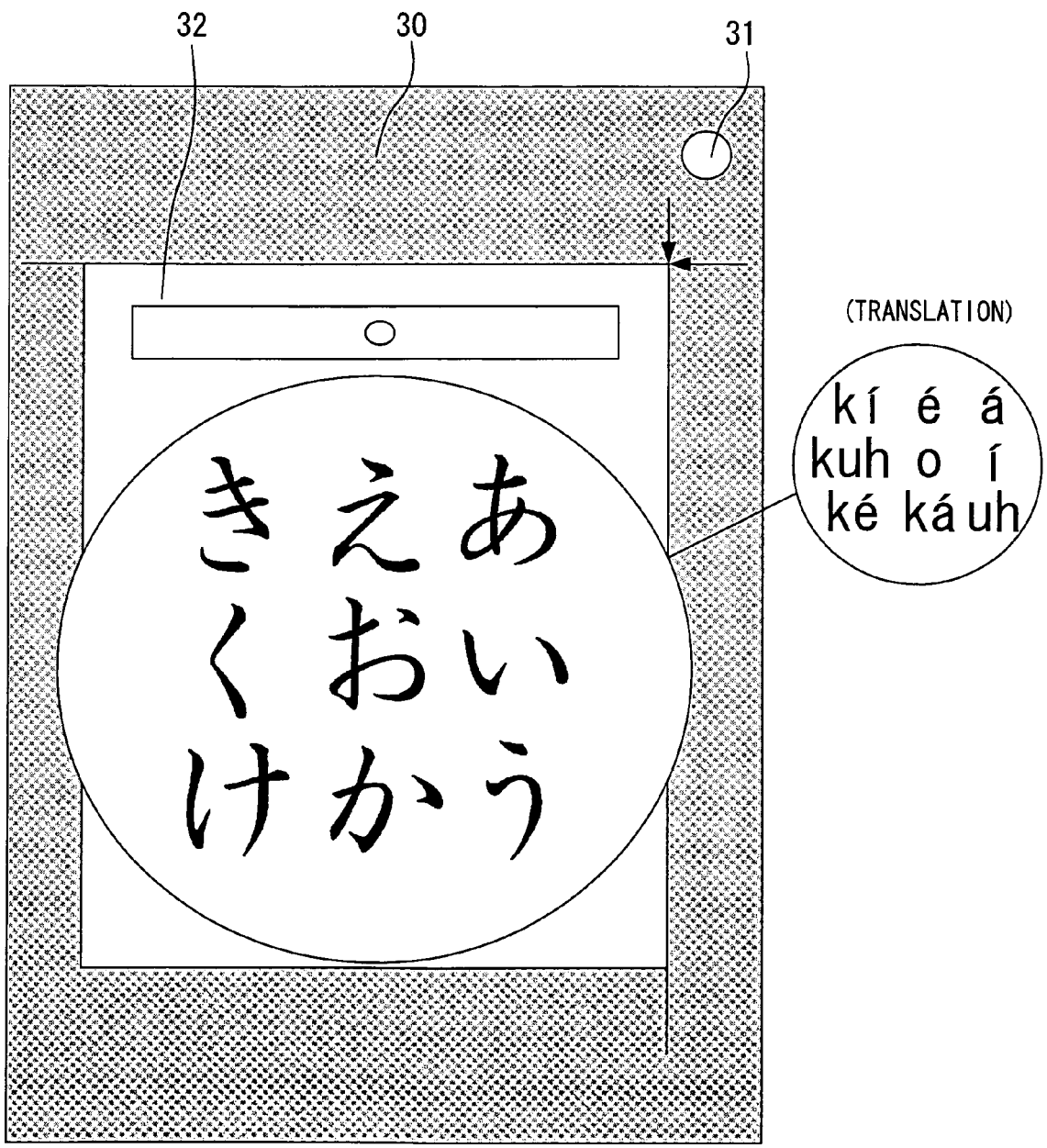

FIG. 6 presents an example of a projection image that may be projected when the distance between the projector 20 and the base pad 30 (paper 32) is more significant. The projection magnification factor is controlled so as to sustain the projection size of the projection information (the size of the characters) unchanged from that in FIGS. 4 and 5 and, as a result, the entire character set "á, í, uh, é, oh, ká, kí, kuh, ké" is projected over the wider projection range (the circular range indicated by the solid line). Since the size of the characters projected on the paper remains unchanged even when the size of the projection range changes due to a change in the positional relationship between the projector 20 and the paper 32 along the perpendicular direction, characters can be projected in the same size as that of the characters having been projected prior to the change in the positional relationship, even though the number of characters to be projected is increased (even as the distance between the projector 20 and the paper 32 lengthens) or even though the number of characters to be projected decreases (even as the distance between the projector 20 and the paper 32 shortens).

(Variation 3)

The present invention may be adopted in an application in which vibration of the projection image attributable to unsteady movement of the writing tool 35 (i.e., the projector 20), is corrected. Based upon the magnetism detection signals corresponding to the three axial directions having been detected via the magnetic sensors 106*a*~106*c*, the CPU 101 determines through arithmetic operation the extent of unsteady movement of the projector 20 relative to the base pad 30 (paper 32). The CPU 101 then causes parallel displacement of the optical image generated at the liquid crystal panel 222 so as to minimize the vibration of the projection image attributable to an unsteady movement occurring along the individual directions. As a result, the extent of vibration of the projection information (the group of characters) projected on the paper 32 is minimized. The circular ranges indicated by the dotted lines in FIG. 4 are shifting projection ranges. Through the vibration correction control, the projected character group "á, í, uh, é, oh" appears to hold a steady position in spite of the shift in the projection range.

When the results of the arithmetic operation executed based upon the magnetism detection signals corresponding to the three axial directions indicate a continuous displacement of the projector 20 along a given direction to an extent less than 10 mm, the CPU 101 judges that the projector has been subjected to vibration caused by an unsteady hand movement and executes the vibration correction control. However, if the arithmetic operation results indicate a continuous displacement of the projector 20 along one direction over a distance equal to or greater than 10 mm, the CPU 101 judges that the writing tool 34 (i.e., the projector 20) has been intentionally moved and accordingly, does not execute the vibration correction control.

If the writing tool 34 (projector 20) has continuously moved along one direction by an extent equal to or greater than 10 mm, the computer 10 executes the scroll control described earlier. In other words, the computer 10 shifts the projection range of the projector 20 when the results of the arithmetic operation executed based upon the magnetism detection signals corresponding to the three axial directions, having been received from the projector 20, indicate a continuous displacement along a single direction over a distance equal to or greater than 10 mm.

Through Variation 3, in which the vibration correction processing is executed for the master example character set to be projected whenever the extent of change in the positional relationship between the projector 20 and the paper 32, occurring along a single direction parallel to the surface of the paper 32, is less than the predetermined value, the group of characters having been projected prior to the change in the positional relationship can be projected by minimizing the extent of image vibration (i.e., by minimizing the extent to which the unsteady hand movement affects the appearance of the projected image).

In addition, by assigning the CPU 101 to the execution of the vibration correction control and assigning the computer 10 to the execution of the scroll control, the processing onus placed on the CPU 101 in the projector 20 can be lessened to ensure that the vibration correction control is executed smoothly. The computer 10, which is not required to execute the vibration correction control operation, is able to execute the scroll control in a smooth manner.

(Variation 4)

While the scroll control operation is executed by the computer 10 and the vibration correction control operation is executed by the CPU 101 in the projector 20 in variation 3 described above, both operations may instead be executed by the computer 10 or the CPU 101. Namely, the computer 10 and the CPU 101 in the projector 20 are both capable of functioning as a control device in the projection system.

(Variation 5)

While the master example character set for penmanship assistance constitutes the projection information in the first embodiment described earlier, the projection information may include information related to the master example. In such a case, the computer 10 designates as the projection information a character in the set of characters to be written on the paper 32, corresponding to the projection range over which light is to be projected via the projector 20, and a message providing advice to the user practicing the penmanship of the particular character. The projection information thus determined by the computer 10 is transmitted to the projector 20 through wireless communication.

Figure 7:
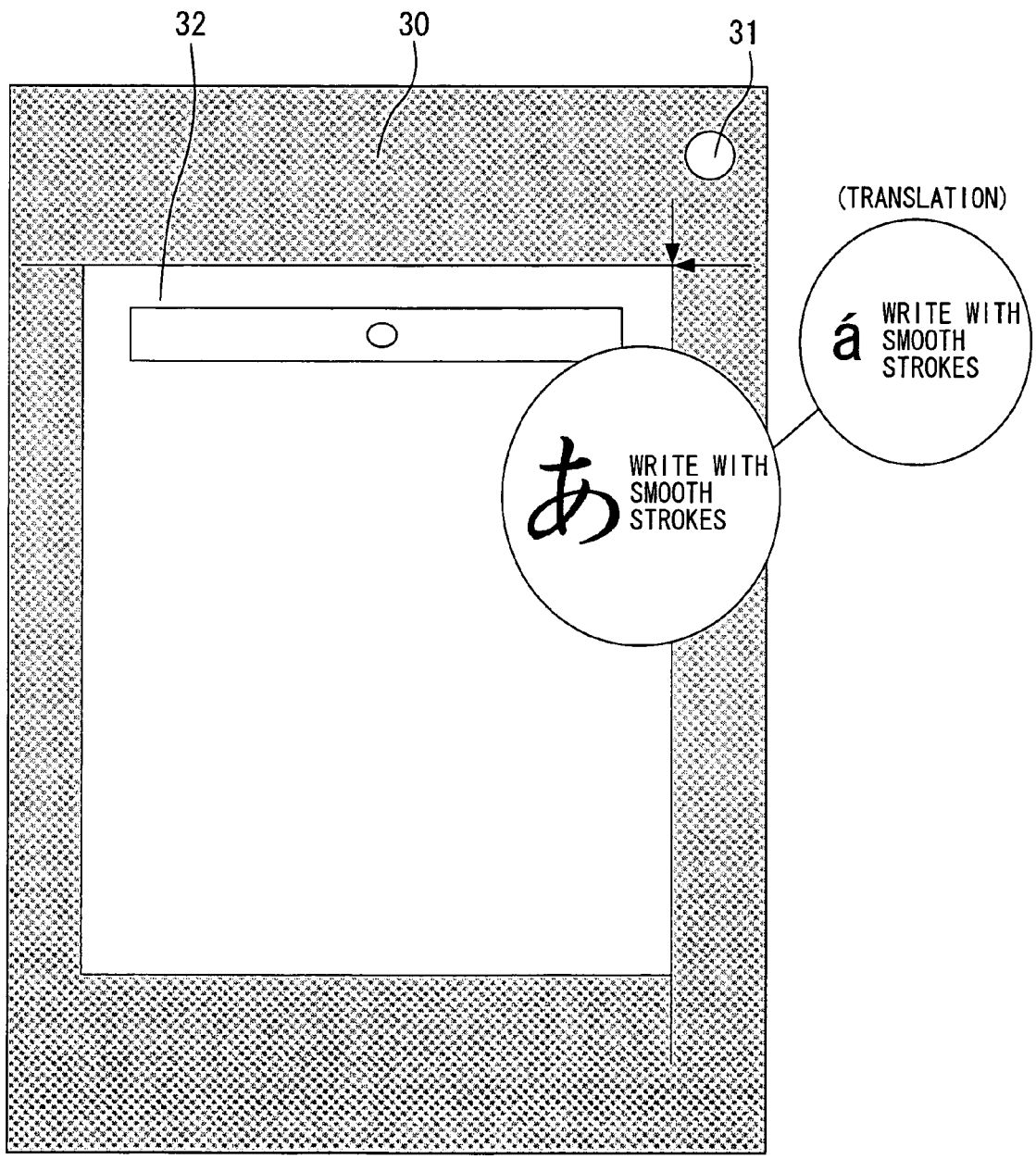

FIG. 7 presents an example of a projection image that may be projected in Variation 5. FIG. 7 shows the character "á" corresponding to the circular projection range among the characters "á, í, uh, é, oh, ká, kí, kuh, ké" and a message related to the particular character. By projecting a message together with the master example character, additional information is provided to the user so that the user is able to learn the characteristics of the target character and receive penmanship tips. Such related information may indicate the correct order of strokes to write the character.

Second Embodiment

In reference to the second embodiment, an application in which the user uses the system when addressing a postcard is described. The user addresses a postcard 32A by using the writing tool 35. The projector 20 mounted at the writing tool 35 projects information transmitted from the computer 10 through wireless communication onto the postcard 32A.

The computer 10 executes a preinstalled addressing projection control program. The computer 10 executes an arithmetic operation by using the magnetism detection data transmitted from the projector 20 and transmits a control signal through wireless communication to the projector 20 from the antenna 12 of the wireless communication module so as to project onto the postcard 32 the correct addressing information (the mailing address, the recipient's name and the like read out from an address book saved in a recording device in the computer 10 in this example).

Figure 8:
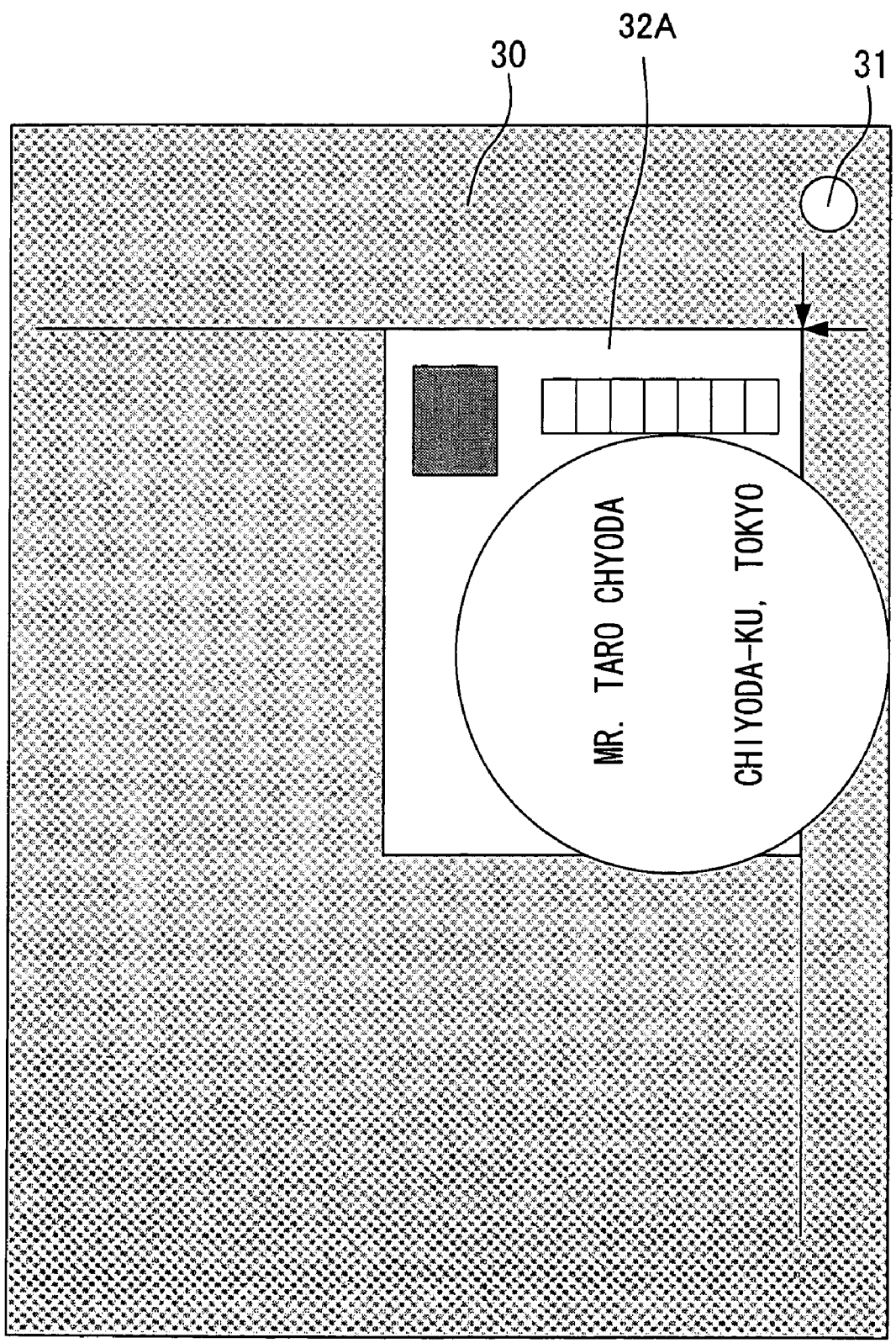

FIG. 8 presents an example of a projection image that may be projected in the second embodiment. As FIG. 8 shows, character strings of the corresponding mailing address and recipient's name are projected in the circular projection range on the postcard 32A. In the example presented in FIG. 8, the mailing address and the recipient's name are to be entered in Japanese on a Japanese postcard. However, as has been explained earlier in reference to the first embodiment, the present invention may be adopted in conjunction with other languages. In the example presented in FIG. 8, Japanese characters are written vertically from top to bottom, but the present invention may be adopted in conjunction with text written from left to right, e.g., English. Namely, the present invention may be adopted in conjunction with any language or postcard format. It will also be obvious that the present invention may be adopted in an application in which an envelope holding a letter is addressed.

In addition, by assuming a structure that enables projection OFF/ON/OFF control in correspondence to the distance between the postcard surface and the projector 20 so as to turn off the projection when the projector 20 is set apart from the postcard 32A by 20 cm or more, and turn on the projection once the projector 20 assumes a position closer to the postcard 30A with their distance less than 20 cm, the content that the user wishes to write can be verified in the projection image.

As the user moves the writing tool 35 closer to the postcard surface in order to start writing and the projector 20 is positioned less than 5 cm from the postcard 32A, the projection is turned off and thus, the user is able to address the postcard without being distracted by the projection image.

It is to be noted that a message providing advice to the user addressing the postcard may be designated as projection information. For instance, if the computer 10 judges that the writing tool 35 is not set at the position corresponding to the address entry position as the user moves the writing tool 35 closer to the postcard surface (e.g., 5 cm from the postcard 32A) in order to start writing the address, a message providing advice to the user writing the address may be projected as the projection information.

Figure 9:
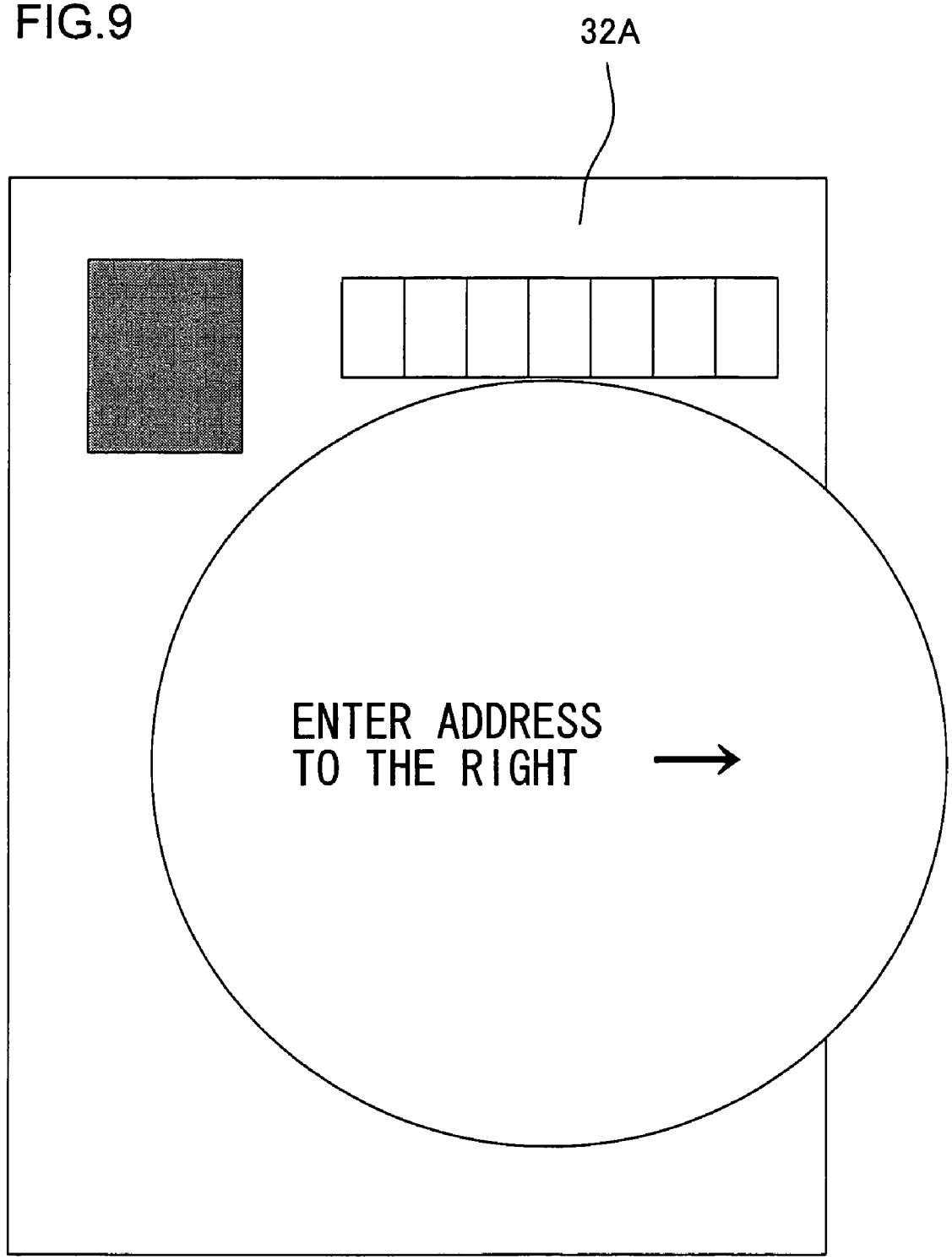
Figure 10:
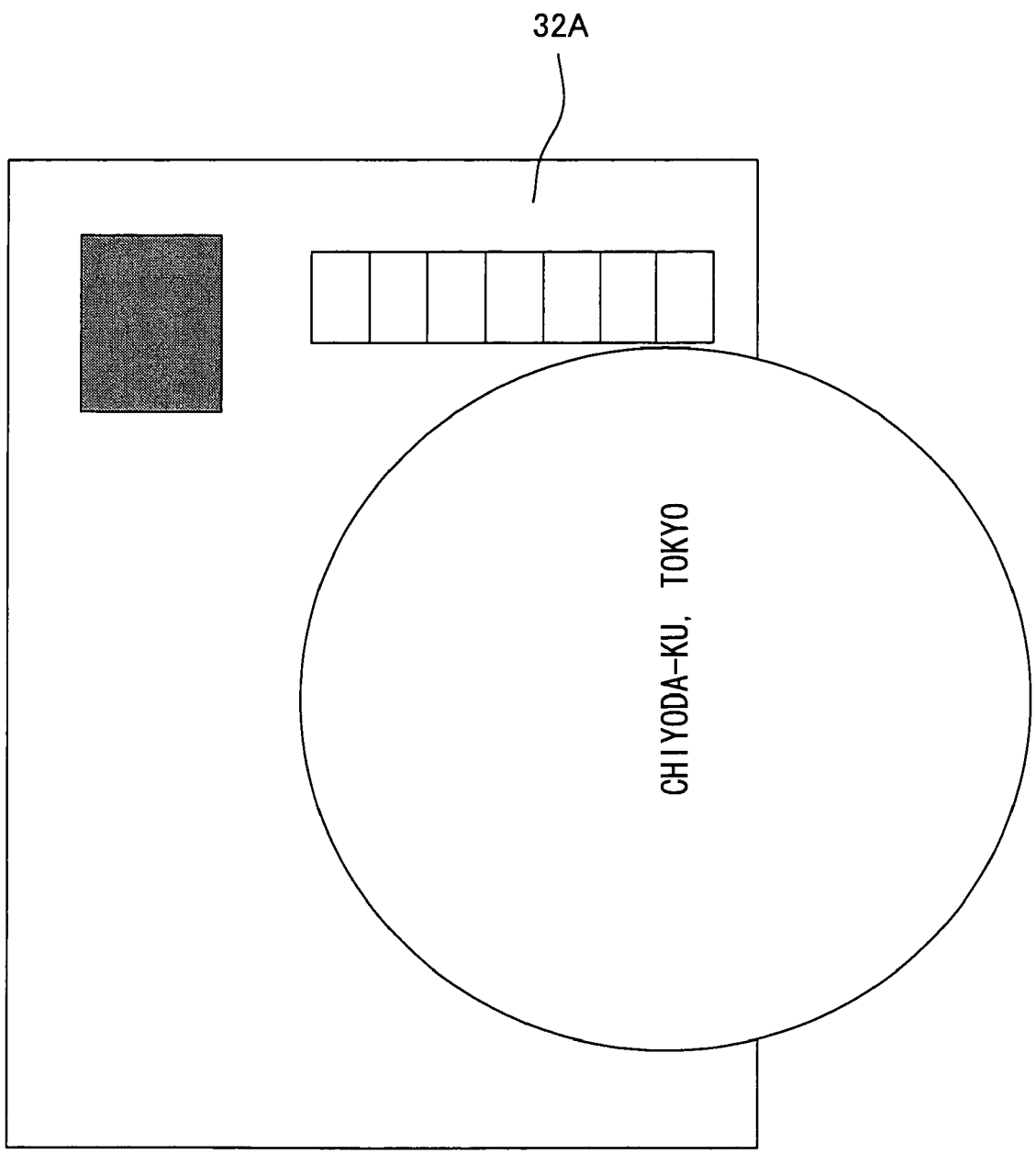

In more specific terms, if the computer 10 judges based upon the magnetism detection signals corresponding to the three axial directions having been received from the projector 20 that the projector 20 (writing tool 35) is positioned too close to the center of the postcard 32A, a message such as that shown in FIG. 9 may be designated as projection information. The projection information selected by the computer 10 will then be transmitted to the projector 20 through wireless communication. In the example presented in FIG. 9, a message indicating the correct address entry position and an arrow pointing to the correct entry position are projected as the projection information, so that the user is able to ascertain the correct address entry position by checking the projection image.

Subsequently, the user having read the projected message will move the writing tool 35 to the right and once the computer 10 judges that the optimal positional relationship has been achieved between the writing tool 35 and the address entry position, the character string representing the mailing address will be designated as the projection information. More specifically, after the computer 10 judges based upon the magnetism detection signals corresponding to the three axial directions having been received from the projector 20 that the position of the projector 20 (writing tool 35) corresponds to the address entry position, the mailing address character string, instead of the message in FIG. 9, is designated as the projection information (see FIG. 10). By checking the projection image shown in FIG. 10, the user will be able to confirm that the writing tool 35 is set at the correct position corresponding to the address entry position and the content of the mailing address.

(Variation 6)

While a single projector 20 is mounted at the writing tool 30 in the examples described above, a plurality of projectors may be mounted at the writing tool. For instance, two projectors 20 may be mounted, one on each of opposite sides of the writing tool 35 so as to project an image via the second projector 20 over an area of the projection image provided by the first projector 20, which is in the shadow of the writing tool 35.

(Variation 7)

While the projection target surface is the penmanship assistance paper 32 or the postcard 32A in the description provided above, the projection target surface is not limited to these examples and it may be, for instance, drawing paper, a canvas or a specific form (e.g., a resume or an application form). Any of such projection target surfaces may be placed on the base pad 30 by aligning a specific corner thereof with a predetermined origin point on the base pad. A computer program correlating the information to be written onto the projection target surface and position (coordinate) information may be executed by the computer 10 in advance.

The computer 10 executes three-dimensional position calculation to determine the three-dimensional position of the projector 20 relative to the projection target surface by using the magnetism detection data transmitted from the projector 20 and transmits through wireless communication the information to be projected onto the projection target surface to the projector 20 from the antenna 12 of the wireless communication module. The projection information may be a pattern, a graphic or a drawing instead of characters. The writing tool 35 with the mounted projector 20 may be a brush, a pen, a pencil or the like, with which an optimal color (a color different from that of the projection target surface) may be applied onto the projection target surface.

(Variation 8)

The projector 20 may be mounted at a work tool instead of the writing tool 35. Such a tool may be a soldering iron, a chisel, a drill, a knife, a screwdriver or the like. The projection target surface in such an application is a workpiece placed on the base pad 30 by aligning a specific point on the workpiece with a predetermined origin point on the base pad. A computer program correlating information required for processing the projection target surface and a specific work position (coordinate) information may be executed by the computer 10 in advance.

The computer 10 executes three-dimensional position calculation to determine the three-dimensional position of the projector 20 relative to the projection target surface by using the magnetism detection data transmitted from the projector 20 and transmits through wireless communication the information to be projected onto the projection target surface to the projector 20 from the antenna 12 of the wireless communication module. The projection information in this application may include characters indicating the dimensions, the desired iron temperature, the screw size, the work procedure or the like in addition to a point, a line, a marking or the like indicating the work position. In addition, by adopting the present invention in an application in which a workpiece undergoes a punching process, information indicating the position of wiring material or a component installed within a workpiece may be projected so as to enable the user of the system to perform the punching process without damaging the wiring material or the component installed within the workpiece.

(Variation 9)

While the projection target surface is placed on the base pad 30, in which the magnetic source 31 is installed, in the example described above, the present invention may be adopted when no base pad is utilized. For instance, it may be adopted in an application in which characters are written or a painting is drawn on a wall of a building by preinstalling a magnetic source at a predetermined position on the wall surface. The projector 20 will be mounted at a spray gun. A computer program correlating the characters or the drawing to be sprayed onto the projection target surface, i.e., the wall surface, and specific position (coordinate) information may be executed by the computer 10 in advance. The computer 10 executes three-dimensional position calculation to determine the three-dimensional position of the projector 20 relative to the projection target surface by using the magnetism detection data transmitted from the projector 20 and transmits through wireless communication the information to be projected onto the projection target surface to the projector 20 from the antenna 12 of the wireless communication module.

The projection information in this type of application will include characters, a drawing or the like to be sprayed onto the projection target surface. As the related information, a character string indicating the work procedure or the like may be provided. In addition, by projecting the entire image to be sprayed onto the wall surface, the user of the system will be able to view the overall image without having to move away from the wall surface. It is to be noted that the CPU 101 will transmit a switchover instruction signal to the computer 10 via the wireless interface circuit 105 in response to an operation at the operation number 103 of the projector 20 whenever the whole image projection needs to be switched over to the normal projection of the characters or the like to be sprayed and vice versa. In response to the switchover instruction signal, the computer 10 will effect a switchover between the normal projection information and the whole image projection information, and will wirelessly transmit the projection information selected through the switchover to the projector 20 from the antenna 12 of the wireless communication module.

While the explanation is given above in reference to the embodiments and variations thereof by assuming that the projection range over which the image is projected via the projector 20 is circular, the projection range may instead be rectangular.

The above described embodiments are example and various modifications can be made without departing from the scope of the invention. In addition, the specific structural features of the first embodiment, the second embodiment and the variations thereof may be adopted in any combination.

The disclosures of the following priority application are herein incorporated by reference:

Japanese Patent Application No. 2007-043697 filed Feb. 23, 2007

Japanese Patent Application No. 2007-043698 filed Feb. 23, 2007

The invention claimed is:

1. A projection system, comprising:
   a projection device mounted at a member that moves through space and projects an optical image;
   a detection device that detects relative position assumed in the space by a projection target surface onto which the optical image is projected and the projection device; and
   a control device that controls projection by the projection device in correspondence to the relative position detected by the detection device.

2. A projection system according to claim 1, wherein:
   the detection device includes a magnetic source that is disposed at the projection target surface or a surface upon which a projection target member having the projection target surface is placed, and generates a specific magnetic field, and magnetic sensors that are disposed at the projection device and individually detect magnetism manifesting along three axes extending perpendicular to one another.

3. A projection system according to claim 1, wherein:
   the control device corrects trapezoidal distortion of the optical image projected by the projection device in correspondence to the relative position detected by the detection device.

4. A projection system according to claim 1, wherein:
   the control device executes scroll control or vibration correction control for information included in the optical image projected by the projection device in correspondence to a change occurring in the relative position detected by the detection device.

5. A projection system according to claim 4, wherein:
   the control device executes the scroll control for the information included in the optical image projected by the projection device when an extent of change in the relative position detected by the detection device, occurring along a single direction parallel to the projection target surface, is equal to or greater than a predetermined value.

6. A projection system according to claim 4, wherein:
   the control device executes the vibration correction control for the information included in the optical image projected by the projection device when an extent of change in the relative position detected by the detection device, occurring along a single direction parallel to the projection target surface, is less than a predetermined value.

7. A projection system according to claim 4, wherein:
   the control device controls a volume of information to be included in the optical image projected by the projection device in correspondence to change occurring in the relative position detected by the detection device.

8. A projection system according to claim 7, wherein:
   when the change in the relative position detected by the detection device manifests along a direction perpendicular to the projection target surface, the control device executes control so that a size of a projection range over which the projection device projects the optical image and a size of the information included in the optical image prior to the change in the relative position are maintained after the change in the relative position.

9. A projection system according to claim 7, wherein:
   when the change in the relative position detected by the detection device manifests along a direction perpendicular to the projection target surface, the control device executes control so as to maintain a size of information included in the optical system, even if a size of a projection range over which the projection device projects the optical image after the change in the relative position is different from the size of the projection range prior to the change in the relative position.

10. A projection system according to claim 1, wherein:
    the control device controls the projection device to project information corresponding to the relative position detected by the detection device.

11. A projection system according to claim 10, further comprising:
    a storage device where information to be projected by the projection device is stored, wherein:
    the control device reads out information assuming an area corresponding to the relative position detected by the detection device from the storage device and controls the projection device to project the information thus read out.

12. A projection system according to claim 10, wherein:
    the detection device includes a magnetic source that is disposed at the projection target surface or a surface upon which a projection target member having the projection target surface is placed and generates a specific magnetic field and magnetic sensors that are disposed at the projection device and individually detect magnetism manifesting along three axes extending perpendicular to one another.

13. A projection system according to claim 10, wherein:
the control device executes control so as to project the optical image that includes first information indicating contents to be applied on the projection target surface.

14. A projection system according to claim 13, wherein:
the control device further executes control so as to project the optical image that includes second information related to the first information.

15. A projection system according to claim 13, wherein:
the control device executes control so as to project the optical image over a specific range of the projection target surface when the relative position detected by the detection device satisfies a predetermined condition.

16. A projection system according to claim 15, wherein:
the control device executes control so as to project the optical image that includes information in the first information corresponding to the specific range.

17. A projection system according to claim 16, wherein:
the control device executes control so as to project the optical image that further includes information in the second information corresponding to the specific range.

18. A projection system according to claim 15, wherein:
the member that moves through the space is a coloring member that colors the projection target surface or a processing member that processes the projection target surface.

19. A projection system according to claim 18, wherein:
the first information includes at least one of a character, a graphic, a mark and a coloring position at which the projection target surface is to be colored by the coloring member, or at least one of a character, a graphic and a mark indicating a processing position at which the projection target surface is to be processed by the processing member; and
the second information includes at least either a procedure or a description related to coloring or processing.

20. A projection system according to claim 18, wherein:
if the relative position indicates that a position assumed by the coloring member and the coloring position do not correspond to each other or that a position assumed by the processing member and the processing position do not correspond to each other, the control device executes control so as to project the optical image that includes information pointing toward the coloring position or the processing position.

21. A projection system according to claim 20, wherein:
if the relative position indicates that the position assumed by the coloring member and the coloring position correspond to each other or that the position assumed by the processing member and the processing position correspond to each other, the control device executes control so as to project the optical image that includes the first information corresponding to the specific range instead of the information pointing toward the coloring position or the processing position.

22. A projector, comprising:
a projection unit that projects an optical image;
a three-dimensional position sensor that detects a position in space;
a communication device that transmits detection information provided by the three-dimensional position sensor to an external device and receives projection information transmitted from the external device based upon the detection information; and
a control device that controls the projection unit so as to project an optical image that includes the projection information received via the communication device.

* * * * *